(12) United States Patent
Lin et al.

(10) Patent No.: US 12,497,950 B2
(45) Date of Patent: *Dec. 16, 2025

(54) OFFSHORE WIND TURBINE GENERATOR SET HAVING A COMPRESSED ENERGY STORAGE SYSTEM

(71) Applicants: CHINA THREE GORGES CORPORATION, Wuhan (CN); THREE GORGES GROUP INDUSTRIAL DEVELOPMENT (BEIJING) CO., LTD, Beijing (CN)

(72) Inventors: Zhihua Lin, Wuhan (CN); Ningning Xie, Wuhan (CN); Xinxing Lin, Wuhan (CN); Ruochen Ding, Wuhan (CN); Geyu Zhong, Wuhan (CN)

(73) Assignees: CHINA THREE GORGES CORPORATION;THREE GORGES GROUP (CN); INDUSTRIAL DEVELOPMENT (BEIJING) CO., LTD (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,631

(22) Filed: May 21, 2024

(65) Prior Publication Data
US 2024/0392748 A1 Nov. 28, 2024

(30) Foreign Application Priority Data
May 22, 2023 (CN) .......................... 202310582085.8

(51) Int. Cl.
*F03D 9/17* (2016.01)

(52) U.S. Cl.
CPC .......... *F03D 9/17* (2016.05); *F05B 2260/422* (2020.08)

(58) Field of Classification Search
CPC ..... F03D 9/17; F03D 9/11; F03D 9/18; F03D 9/25; F03D 9/257; F03D 13/25; F03D 80/00; F03D 9/28; F05B 2260/422; Y02E 10/72; Y02E 60/16
See application file for complete search history.

(56) References Cited

U.S. PATENT DOCUMENTS

| 2009/0145130 A1* | 6/2009 | Kaufman | F25J 1/0251 60/722 |
| 2011/0233934 A1* | 9/2011 | Crane | F03D 15/10 290/55 |

FOREIGN PATENT DOCUMENTS

CN 202310582085.8 5/2023

* cited by examiner

*Primary Examiner* — Joseph Ortega

(57) ABSTRACT

Provided is an offshore wind turbine generator set having a compressed energy storage system. The set includes, a wind turbine generator set, an air compressor set, an air expander set, a first motor generator, a three-in-one motor, and a combined air storage device, in which the first motor generator is alternatively connected to the wind turbine generator set or the air compressor set, the air compressor set is coaxially connected to the air expander set by means of a three-in-one motor, the combined air storage device includes a first air storage device provided in a tower barrel and a second air storage device provided on the sea, an input end of the combined air storage device is connected to the air compressor set, and an output end of the combined air storage device is connected to the air expander set.

10 Claims, 12 Drawing Sheets

OFFSHORE WIND TURBINE GENERATOR SET HAVING A COMPRESSED ENERGY STORAGE SYSTEM

TECHNICAL FIELD

The present invention relates to the technical field of wind turbine storage, in particular to an offshore wind turbine generator set having a compressed energy storage system.

BACKGROUND

At present, there are still intermittency, fluctuations and instability in the large-scale wind turbine grid connection process, especially in economically developed coastal areas, the high-load power demand and the peak-to-valley huge difference lead to a sudden increase in a pressure for adjusting the peak and frequency of the power grid, and the unstable new energy sources such as wind turbine generation increase the high proportion absorptive grid connection conflicts. There is an urgent need to improve the self-absorptive level of new energy sources, so as to implement a distributed energy system, a regional-level intelligent micro-grid, and a friendly-source-grid load storage new power system.

The power generation capacity of a wind turbine generator set is related to different wind conditions (a stable wind condition, a wind gust condition, a gradually changing wind condition, etc.), so that energy storage naturally needs to be configured. An existing offshore wind turbine is indirectly coupled to a compressed air energy storage system to adjust and respond to a fluctuating load of a power grid. The wind turbine and the compressed air energy storage system are respectively connected to the power grid. A "source-grid-load-storage" connection mode is implemented merely by means of a "grid", and various sub-systems are arranged dispersedly and occupy a large space, which is not conducive to reducing the costs of offshore wind power and the total system costs.

At present, an air storage device in which an offshore wind turbine generator set is indirectly coupled to a compressed air energy storage system has relatively high costs and a relatively low energy capacity and density, including an onshore underground cavern, an onshore artificial chamber and an onshore ground air storage device. Such air storage manners all occupy expensive onshore land, require remote power transmission and distribution, and have high construction costs and power transmission and distribution costs. In addition, underground caverns include salt caverns, underground aquifers, hard rock formations caverns, natural salt rock caverns, waste natural gas or petroleum gas storage chambers, and are limited by geographical conditions.

SUMMARY

In view of this, the present invention provides an offshore wind turbine generator set having a compressed energy storage system, so as to solve at least one of the following technical problems: an offshore wind turbine generator set is indirectly coupled to a compressed air energy storage system, such that the arrangement is dispersive and construction costs are high; and the air storage device of the compressed air energy storage system has high costs.

The present invention provides an offshore wind turbine generator set having a compressed energy storage system, including a wind turbine generator set, an air compressor set, an air expander set, a first motor generator, and a three-in-one motor which are provided in a wind turbine generator compartment, and a combined air storage device provided outside the wind turbine generator compartment, in which the first motor generator has a first input shaft and a first output shaft, the first input shaft is connected to the wind turbine generator set by means of a first clutch, and the first output shaft is connected to the air compressor set; the air compressor set and the air expander set are coaxially connected by means of the three-in-one motor, the three-in-one motor includes a second output shaft and a second input shaft, the second output shaft is connected to the air compressor set by means of a second clutch, and the second input shaft is connected to the air expander set by means of a third clutch; the combined air storage device includes a first air storage device provided in a tower barrel and a second air storage device provided on the sea, the inner cavity of the first air storage device is in connection with the inner cavity of the second air storage device, an input end of the combined air storage device is connected to the air compressor set, and an output end of the combined air storage device is connected to the air expander set; and the first motor generator and the three-in-one motor are both electrically connected to a power grid in a controllable manner, the air compressor set is connected to the input end of the combined air storage device by means of an energy storage pipeline, and the air expander set is connected to the output end of the combined air storage device by means of an energy release pipeline.

The offshore wind turbine generator set having a compressed energy storage system provided by the embodiments of the present invention has the following advantages:

1. an air compressor set and an air expander set of a compressed air energy storage system are directly embedded into a wind turbine generator compartment on the sea, so that the wind turbine generator set and the compressed air energy storage system on the sea are directly coupled, the structure is compact, the occupied space is small, and construction costs of the wind turbine generator set and the compressed air energy storage system on the sea are reduced.

2. The air compressor set and the wind turbine generator set are coupled by means of a first motor generator and a first clutch, the power supply of the first motor generator can be a power grid supply and may also be a power supply of a wind turbine generator set, so that a "source-grid-load-storage" connection mode is not only implemented by means of a "grid", and the compressed air energy storage system may be directly coupled to a wind power plant power supply at a source side nearby, implementing the distributed energy storage and regional micro-grid, and reducing the costs of power transmission and distribution by being close to a coastal load center. The air compressor set is driven by a first motor generator, and the first motor generator is powered by a grid power supply or a wind power plant power supply, and is implemented by controlling on/off of a first clutch depending on power grid requirements.

3. An air compressor set and an air expander set are coaxially connected by means of a three-in-one motor. On the one hand, the electromechanical conversion loss caused by a multi-axis connection can be reduced, thereby improving the energy conversion efficiency; on the other hand, the described connection is beneficial to improving the level of system integration and the space utilization rate, thereby saving construction and operational and maintenance costs, and achieving the effect of decreasing the costs and increasing the efficiency. The three-in-one motor is connected to the air compressor set by means of a second clutch, and can be used as a motor to drive the air compressor set to compress air; or is connected to the air expander set by means of a third clutch, and is used as a generator to drive the air expander set to expand and generate power; or as a phase modifier to increase a reactive output when a grid voltage decreases, and absorb the reactive power when the grid voltage increases, thereby maintaining the grid voltage, improving the stability of a system, and improving the power supply quality of the system.

4. In a compressed air energy storage system, a first air storage device is provided by means of combined air storage, i.e. by using a pipeline-like steel storage tank structure of a tower barrel itself, a second air storage device is provided on the sea, and the first air storage device is combined with the second air storage device so as to improve the energy storage capacity and density after coupling. Compared with the traditional manner of using onshore underground caverns, this manner is not limited by geographical conditions, and does not occupy the expensive onshore land, shortening a power transmission distance, and reducing construction costs and power transmission costs. The air storage capacities of the first air storage device and the second air storage device can be rationally configured according to different energy storage requirements.

As an optional embodiment, a tower barrel includes a plurality of tower barrel segments connected in an axial direction, and the first air storage device is provided in at least one tower barrel segment, or the first air storage device is at least one tower barrel segment.

As an optional embodiment, the tower barrel includes an outer barrel body and an inner barrel body which are sheathed, the first air storage device is provided in a cavity between the outer barrel body and the inner barrel body, or the cavity between the outer barrel body and the inner barrel body serves as the first air storage device.

As an optional embodiment, the second air storage device includes a rigid storage tank provided under water, and the inner cavity of the rigid storage tank is in connection with the inner cavity of the first air storage device.

As an optional embodiment, the second air storage device includes a flexible air bag, and the inner cavity of the flexible air bag is in connection with the inner cavity of the first air storage device.

As an optional embodiment, the rigid storage tank is connected to a drainage device and a water suction device.

As an optional embodiment, the drainage device and the water suction device are integrally provided, and include a generator motor and a reversible pump turbine which are connected to each other, and the pump turbine is connected to the rigid storage tank by means of an internal water inlet and outlet pipeline.

As an optional embodiment, the flexible air bag is connected to the tower barrel by means of a lifting mechanism, the lifting mechanism includes a first pulley block fixedly provided on the tower barrel, a second pulley block fixedly provided on the sea floor, and a rope connected between the first pulley block and the second pulley block, the flexible air bag is connected to the rope, and the first pulley block is connected to a second motor generator.

As an optional embodiment, a buffer tank is further provided in the wind turbine generator compartment, the buffer tank is adapted to store air in a liquid state or in a super/trans-critical state, the buffer tank is in connection with the combined air storage device, an input end of the buffer tank is connected to the air compressor set, and an output end of the buffer tank is connected to the air expander set.

During energy storage, redundant electric energy is converted into mechanical energy by using a power grid load valley, and then is converted into pressure potential energy and heat energy of air, which are respectively stored in an air storage device and a heat storage sub-system. During energy release, the potential energy and the internal energy of the high-pressure and high-temperature air are converted into mechanical energy, and then are converted into electric energy to output peak clipping to the outside.

As an optional embodiment, a common heat exchange device is provided between the air compressor set and the air expander set, the common heat exchange device includes a first heat exchange channel for circulating compressed air, a second heat exchange channel for circulating expanded air, and a third heat exchange channel for circulating a heat exchange working medium, the first heat exchange channel is connected to the energy storage pipeline, and the second heat exchange channel is connected to the energy release pipeline.

As an optional embodiment, a plurality of offshore wind turbine generator sets are provided, a plurality of second air storage devices are provided, and any number of first air storage devices are connected to any number of second air storage devices.

BRIEF DESCRIPTION OF THE DRAWINGS

To describe the technical solutions in the embodiments of the present invention or in the prior art more clearly, the accompanying drawings required for describing the embodiments or in the prior art are briefly introduced as follows. Obviously, the accompanying drawings in the following description show merely some embodiments of the present invention, and for a person of ordinary skill in the art, other drawings may also be obtained according to these drawings without any inventive effort.

Figure 1:
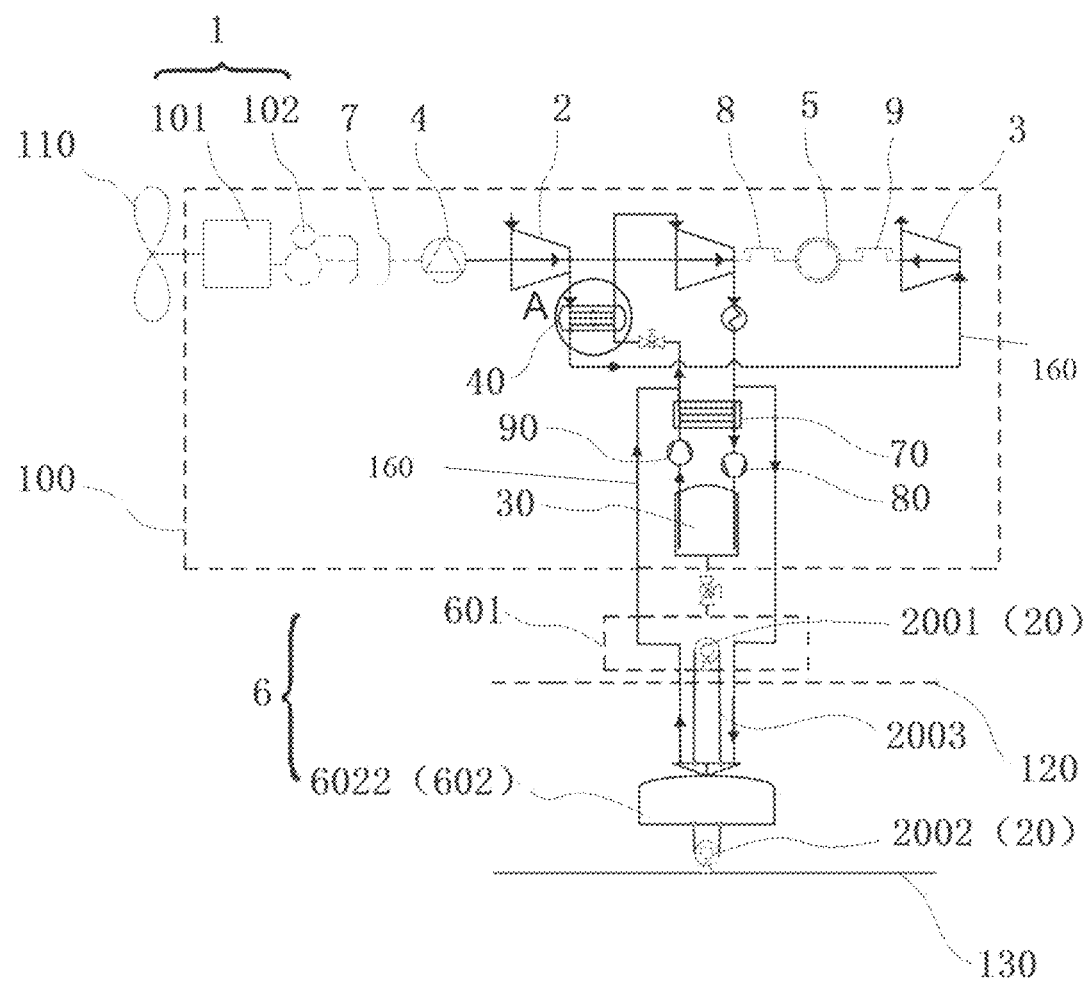
FIG. 1 is a schematic structural diagram of a first kind of offshore wind turbine generator set having a compressed energy storage system according to examples of the present invention.

DESCRIPTION OF REFERENCE SIGNS 1, wind turbine generator set; 101, main shaft, 102, gear box; 2, air compressor set; 3, air expander set; 4, first motor generator; 5, three-in-one motor; 6, combined air storage device; 601, first air storage device; 602, second air storage device; 6021, rigid storage tank; 6022, flexible air bag; 7, first clutch; 8, second clutch; 9, third clutch; 10, tower barrel; 1001, tower barrel segment; 1002, outer barrel body; 1003, inner barrel body; 20, lifting mechanism, 2001, first pulley block; 2002, second pulley block; 2003, rope; 30, buffer tank; 40, common heat exchange device; 50, heat collection device; 60, cold storage device; 70, cold storage heat exchanger, 80: pressure decreasing device; 90: pressure increasing device; 100, wind turbine generator compartment; 110, blade; 120, sea level; 130, sea floor; 140, cooler; 150, reheater: 160, pipeline: 170, a device with functions of drainage and water suction: 180, first heat exchange channel: 190, second heat exchange channel: 200, third heat exchange channel.

DETAILED DESCRIPTION

To make the objectives, technical solutions, and advantages of the embodiments of the present invention clearer, the technical solutions of the embodiments of the present invention are clearly and completely described in the following with reference to the accompanying drawings in the embodiments of the present invention. Apparently, the described embodiments are a part rather than all of the embodiments of the present invention. All other embodiments obtained by a person skilled in the art based on the embodiments of the present invention without creative efforts shall belong to the scope of protection of the present invention.

The examples of the present invention are described as follows with reference to FIG. 1 to FIG. 11.

According to examples of the present invention, in a first aspect, the present invention provides an offshore wind turbine generator set having a compressed energy storage system, a wind turbine generator set 1 and part of the electromechanical apparatuses the compressed air energy storage system are integrated in the wind turbine generator compartment 100, specifically, the offshore wind turbine generator set includes a wind turbine generator set 1, an air compressor set 2, an air expander set 3, a first motor generator 4, a three-in-one motor 5 which are provided in a wind turbine generator compartment 100, and a combined air storage device 6 provided outside the wind turbine generator compartment 100; the first motor generator 4 has a first input shaft and a first output shaft, the first input shaft is connected to the wind turbine generator set 1 by means of a first clutch 7, and the first output shaft is connected to the air compressor set 2; the air compressor set 2 and the air expander set 3 are coaxially connected by means of the three-in-one motor 5, the three-in-one motor 5 includes a second output shaft and a second input shaft, the second output shaft is connected to the air compressor set 2 by means of a second clutch 8, and the second input shaft is connected to the air expander set 3 by means of a third clutch 9; the combined air storage device 6 includes a first air storage device 601 provided in a tower barrel 10 and a second air storage device 602 provided on the sea, the inner cavity of the first air storage device 601 is in connection with the inner cavity of the second air storage device 602, an input end of the combined air storage device 6 is connected to the air compressor set 2, and an output end of the combined air storage device 6 is connected to the air expander set 3.

The offshore wind turbine generator set provided by the examples of the present invention has the following advantages:

1. an air compressor set 2 and an air expander set 3 of a compressed air energy storage system are directly embedded into a wind turbine generator compartment 100 of the wind turbine generator set 1 on the sea, so that the wind turbine generator set 1 and the compressed air energy storage system on the sea are directly coupled, the structure is compact, the occupied space is small, and construction costs of the wind turbine generator set 1 and the compressed air energy storage system on the sea are reduced. By optimizing the space inside the wind turbine generator compartment 100, the electromechanical apparatuses of a compact micro-compressed air energy storage system can be built into the wind turbine generator compartment 100. The offshore wind turbine generator sets 1 of different capacities can be adapted to a compact micro-compressed air energy storage system embedded into the wind turbine generator compartment 100 according to the energy storage ratio. The compact micro-compressed air energy storage system is directly embedded into a wind turbine generator compartment 100 of a land wind turbine generator set, so as to solve the intermittent uncontrollability of land wind turbine grid connection, implementing distributed energy storage of renewable energy and a regional intelligent micro-grid, and reducing remote power transmission and distribution costs and construction costs of a compressed air energy storage system.

2. The air compressor set 2 and the wind turbine generator set 1 are coupled by means of a first motor generator 4 and a first clutch 7, the power supply of the first motor generator 4 can be a power grid supply and may also be a power supply of a wind turbine generator set 1, so that a "source-grid-load-storage" connection mode is not only implemented by means of a "grid", and the compressed air energy storage system may be directly coupled to a wind power plant power supply at a source side nearby, implementing the distributed energy storage and regional micro-grid, and reducing the costs of power transmission and distribution by being close to a coastal load center. The air compressor set 2 is driven by a first motor generator 4, and the first motor generator 4 is powered by a grid power supply or a wind power plant power supply, and is implemented by controlling on/off of a first clutch 7 depending on power grid requirements.

3. An air compressor set 2 and an air expander set 3 are coaxially connected by means of a three-in-one motor 5. On the one hand, the electromechanical conversion loss caused by a multi-axis connection can be reduced, thereby improving the energy conversion efficiency; on the other hand, the described connection is beneficial to improving the level of system integration and the space utilization rate, thereby saving construction and operational and maintenance costs, and achieving the effect of reducing the costs and increasing the efficiency. The three-in-one motor 5 is connected to the air compressor set 2 by means of a second clutch 8, and can be used as a motor to drive the air compressor set 2 to compress air; or is connected to the air expander set 3 by means of a third clutch 9, and is used as a generator to drive the air expander set 3 to expand and generate power; or as a phase modifier to increase a reactive output when a grid voltage decreases, and absorb the reactive power when the grid voltage increases, thereby maintaining the grid voltage, improving the stability of a system, and improving the power supply quality of the system. By using a clutch in cooperation with the combination of three machines, i.e. a generator, a motor and a phase modifier, costs of mechanical apparatuses and electrical apparatuses can be greatly reduced. The coaxial positions and the number of the mechanical and electrical apparatuses may be arranged according to the matched air compressor set 2, the air expander set 3 and the three-in-one motor 5.

4. In a compressed air energy storage system, a first air storage device 601 is provided by means of combined air storage, i.e. by using a pipeline-like steel storage tank structure of a tower barrel 10 itself, a second air storage device 602 is provided on the sea, and the first air storage device 601 is combined with the second air storage device 602 so as to improve the energy storage capacity and density after coupling. Compared with the traditional manner of using onshore underground caverns, this manner is not limited by geographical conditions, and does not occupy the expensive onshore land, shortening a power transmission distance, and reducing construction costs and power transmission costs. The air storage capacity of the first air storage device 601 and the second air storage device 602 can be rationally configured according to different energy storage requirements.

Specifically, referring to FIG. 1, the wind turbine generator set 1 includes a main shaft 101 and a gear box 102. One end of the main shaft 101 is connected to a blade 110, the other end of the main shaft 101 is connected to the gear box 102, and an input shaft of the gear box 102 is connected to the first motor generator 4 by means of the first clutch 7. Specifically, when the first clutch 7 is in a connected state, the first motor generator 4 is connected to the gear box 102, and the power supply sent by the wind turbine generator set 1 directly drives the first motor generator 4 to rotate, thereby driving the air compressor set 2 to operate. When the first clutch 7 is in a disconnected state, the first motor generator 4 is disconnected from the gear box 102, and the first motor generator 4 is driven by the power supply of the power grid, thereby driving the air compressor set 2 to operate.

Specifically, the wind turbine generator set 1 further includes an electric control system. The electric control apparatuses in the air compressor set 2 and the air expander set 3 are electrically connected to an electric control system of the wind turbine generator set 1.

With regard to the operation of the three-in-one motor 5, specifically, when the second clutch 8 is in a connected state and the third clutch 9 is in a disconnected state, the second output shaft of the three-in-one motor 5 is connected to the air compressor set 2, which can drive the air compressor set 2 to operate, and at this time, an air compression and energy storage process is performed. When the second clutch 8 is in a disconnected state and the third clutch 9 is in a connected state, the second input shaft of the three-in-one motor 5 is connected to the air expander set 3, which can drive the air expander set 3 to operate to generate power, and at this time, a process of air expansion and energy release, and power generation is performed.

Specifically, the air compressor set 2 includes a multi-stage air compressor, and the air expander set 3 includes a multi-stage air expander.

Figure 2:
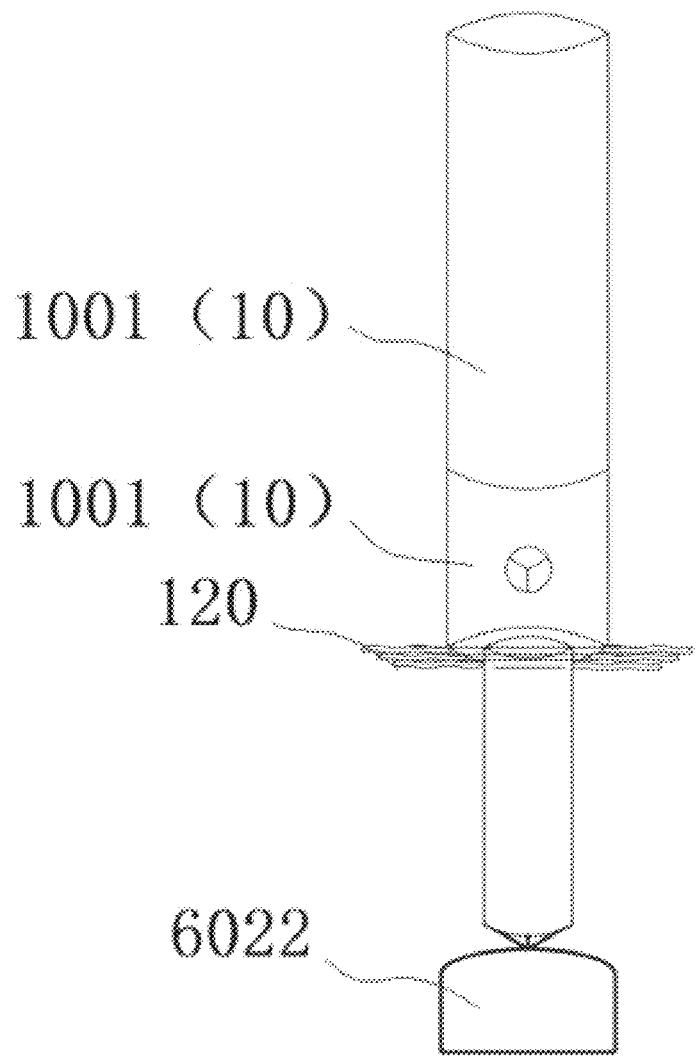
FIG. 2 is a schematic structural diagram of a first kind of combined air storage device in FIG. 1.
Figure 6:
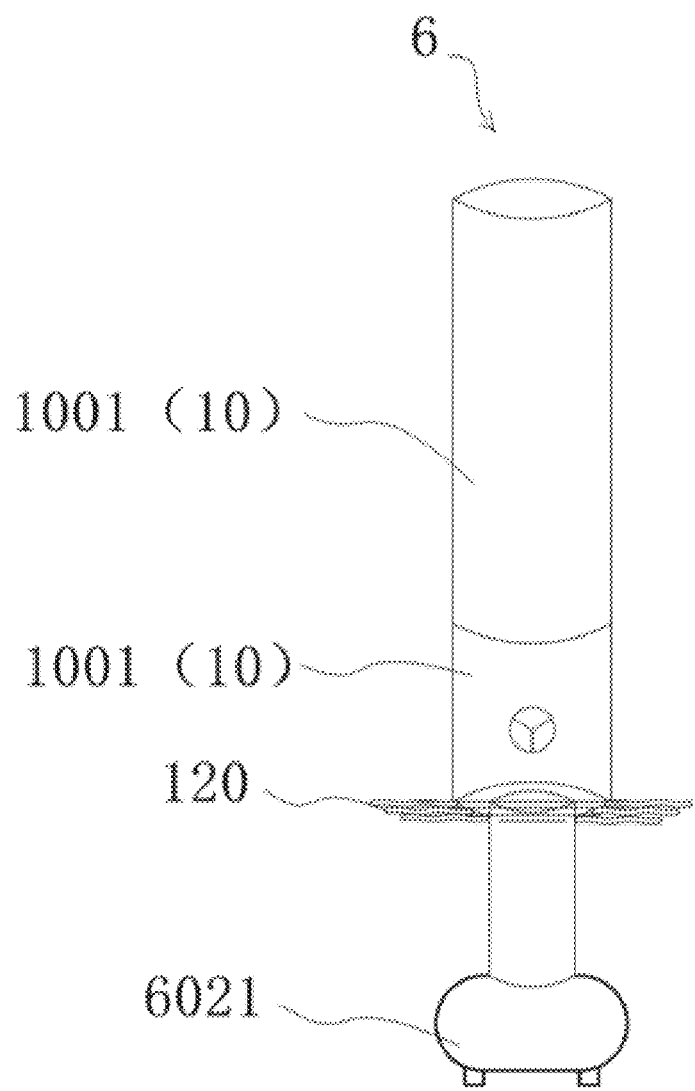
FIG. 6 is a schematic structural diagram of a first kind of combined air storage device in FIG. 5.
Figure 7:
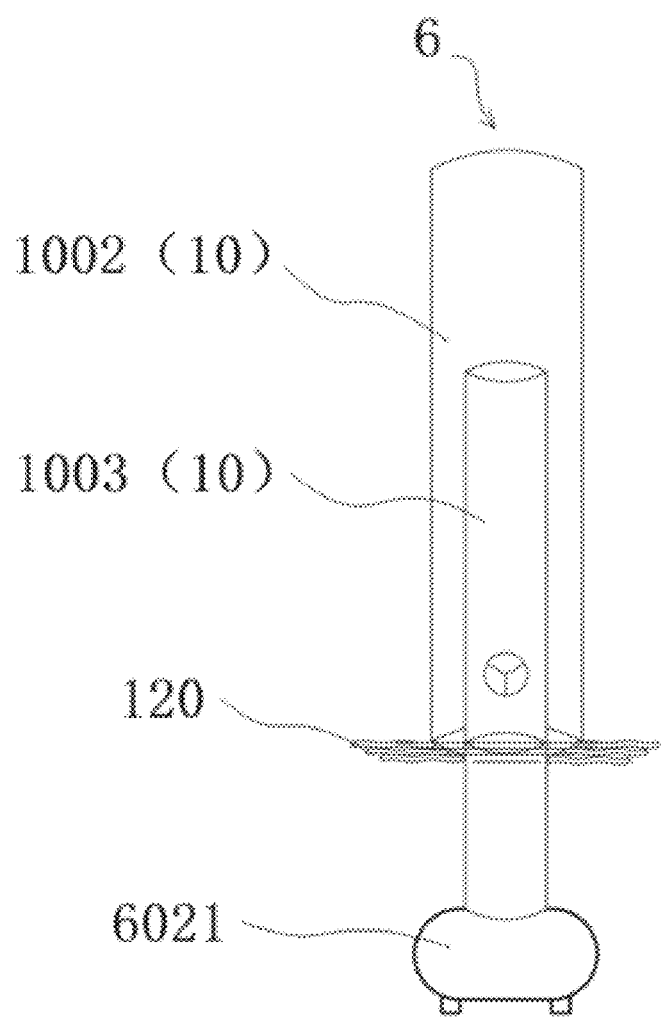
FIG. 7 is a schematic structural diagram of a second kind of combined air storage device in FIG. 5.
Figure 8:
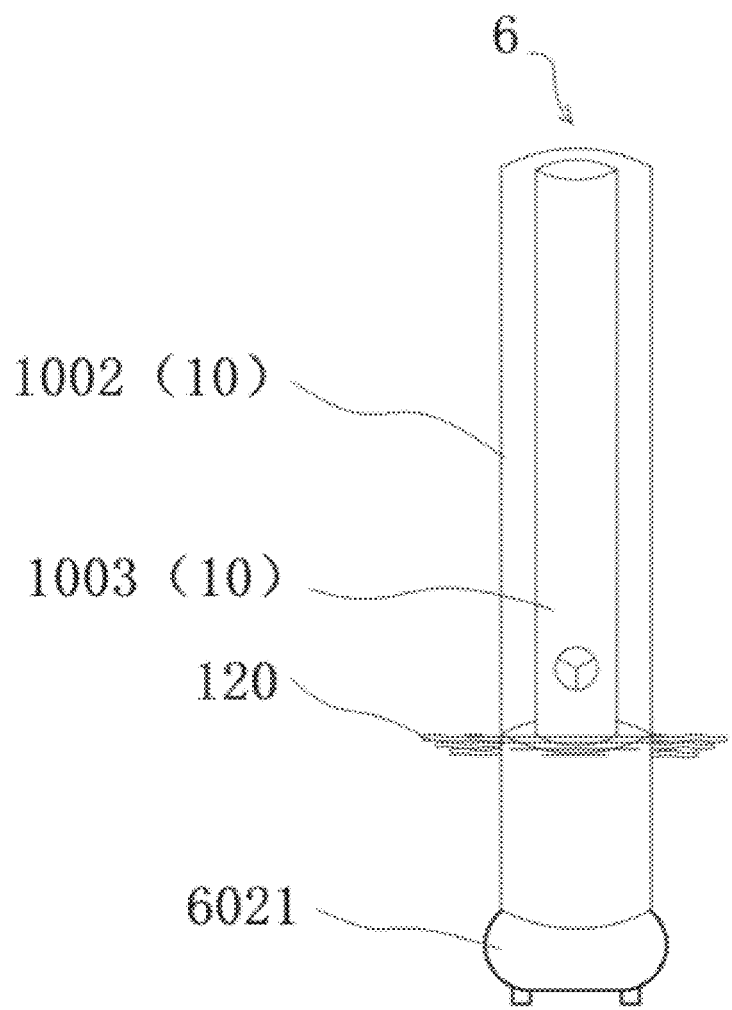
FIG. 8 is a schematic structural diagram of a third kind of combined air storage device in FIG. 5.

In one example, referring to FIG. 2 or FIG. 6, the tower barrel 10 includes a plurality of tower barrel segments 1001 connected in an axial direction, and the first air storage device 601 is provided in at least one of the tower barrel segments 1001, or the first air storage device 601 is at least one of the tower barrel segments 1001.

As the tower barrel 10 is a pipeline-like steel storage tank structure, by optimizing the inner space of the tower barrel 10, one or more tower barrel segments 1001 can be used as air storage tanks, and directly serve as a first air storage device 601, that is, the outer wall of the tower barrel 10 is the housing of the first air storage device 601, and the inner cavities of the tower barrel segments 1001 serve as the air storage cavity of the first air storage device 601. Certainly, the first air storage device 601 may also be placed in the inner cavities of the tower barrel segments 1001 in other forms. For example, the first air storage device 601 includes an air storage barrel, and the air storage barrel is provided inside the tower barrel segments 1001 to store air.

In one example, the tower barrel 10 includes an outer barrel body 1002 and an inner barrel body 1003 which are sheathed, the first air storage device 601 is provided in a cavity between the outer barrel body 1002 and the inner barrel body 1003, or the cavity between the outer barrel body 1002 and the inner barrel body 1003 serves as the first air storage device 601. That is, referring to FIGS. 3, 4, 7 or 8, the side walls of the outer barrel body 1002 and the inner barrel body 1003 of the tower barrel 10 form the housing of the first air storage device 601, and the cavity between the outer barrel body 1002 and the inner barrel body 1003 serves as the air storage cavity of the first air storage device 601. Certainly, the first air storage device 601 may also adopt other structures. For example, if the first air storage device 601 is an air storage barrel, the air storage barrel is provided between the outer barrel body 1002 and the inner barrel body 1003. The air storage capacity of the first air storage device 601 is adjusted adaptively according to the structure of the tower barrel 10.

Figure 3:
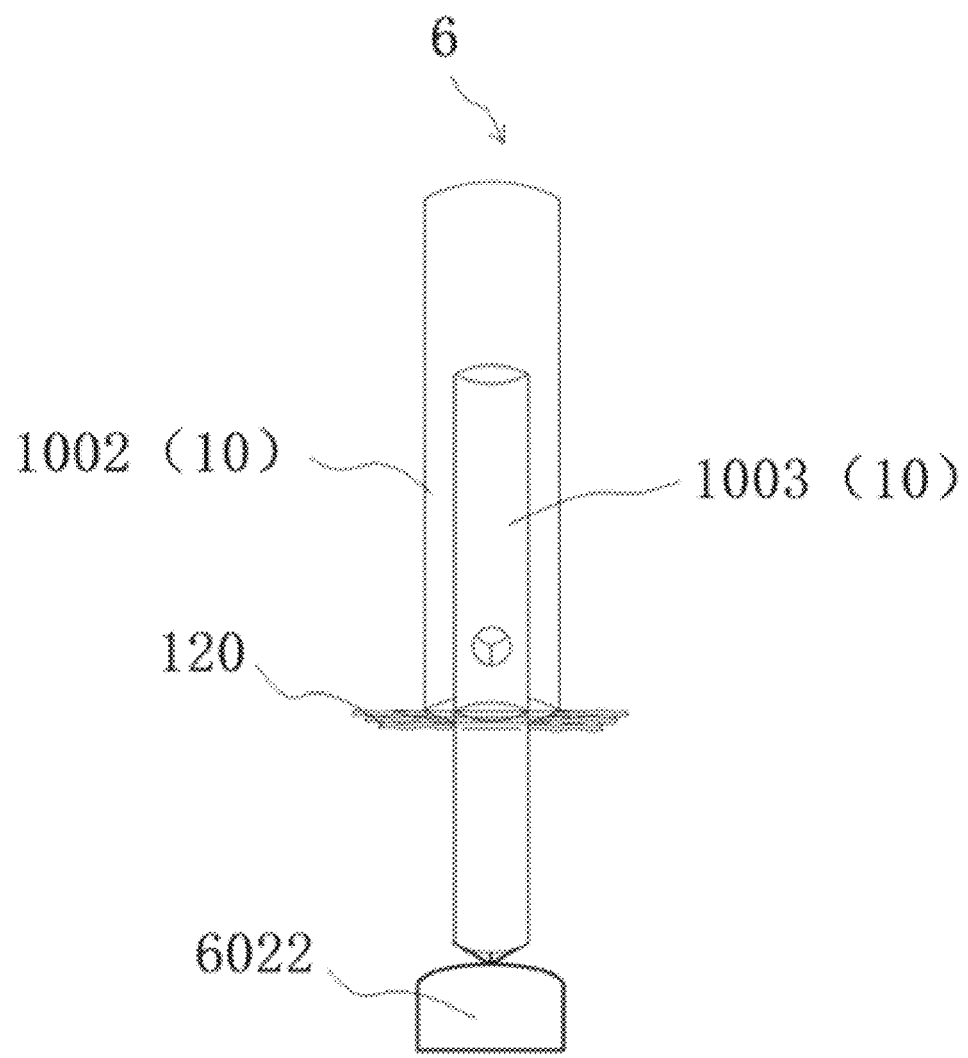
FIG. 3 is a schematic structural diagram of a second kind of combined air storage device in FIG. 1.
Figure 4:
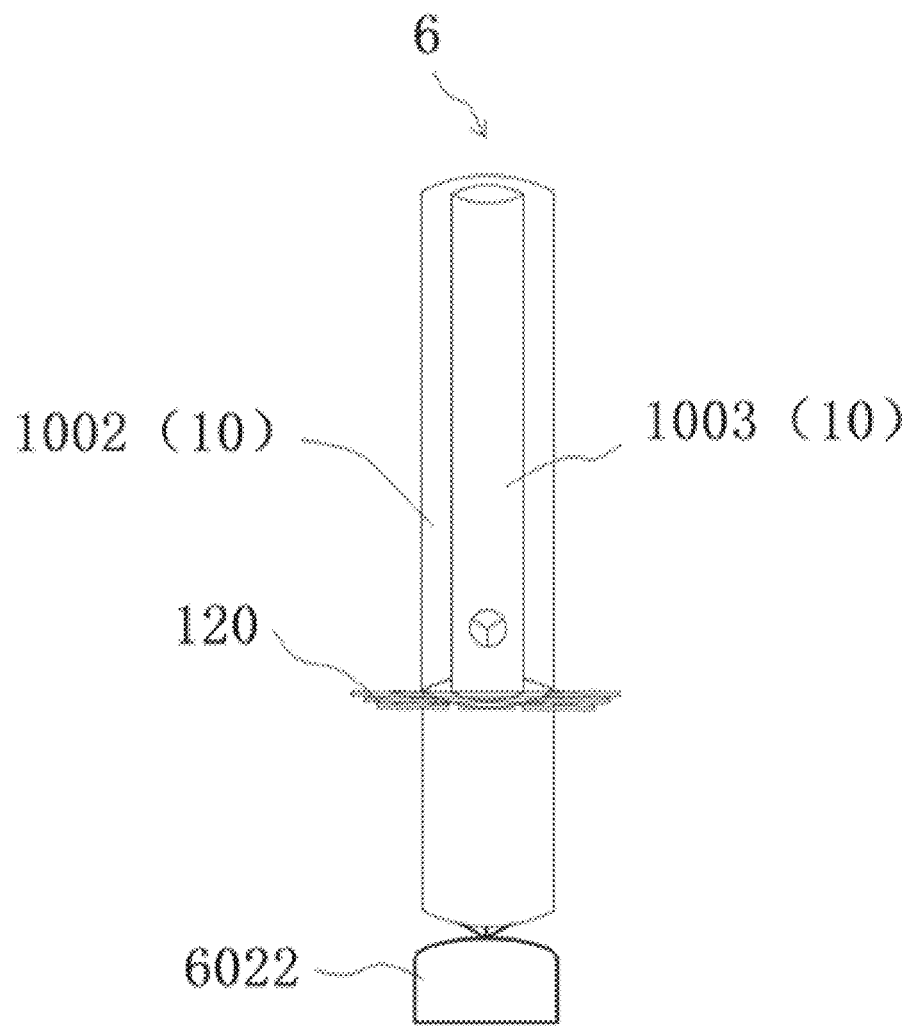
FIG. 4 is a schematic structural diagram of a third kind of combined air storage device in FIG. 1.
Figure 5:
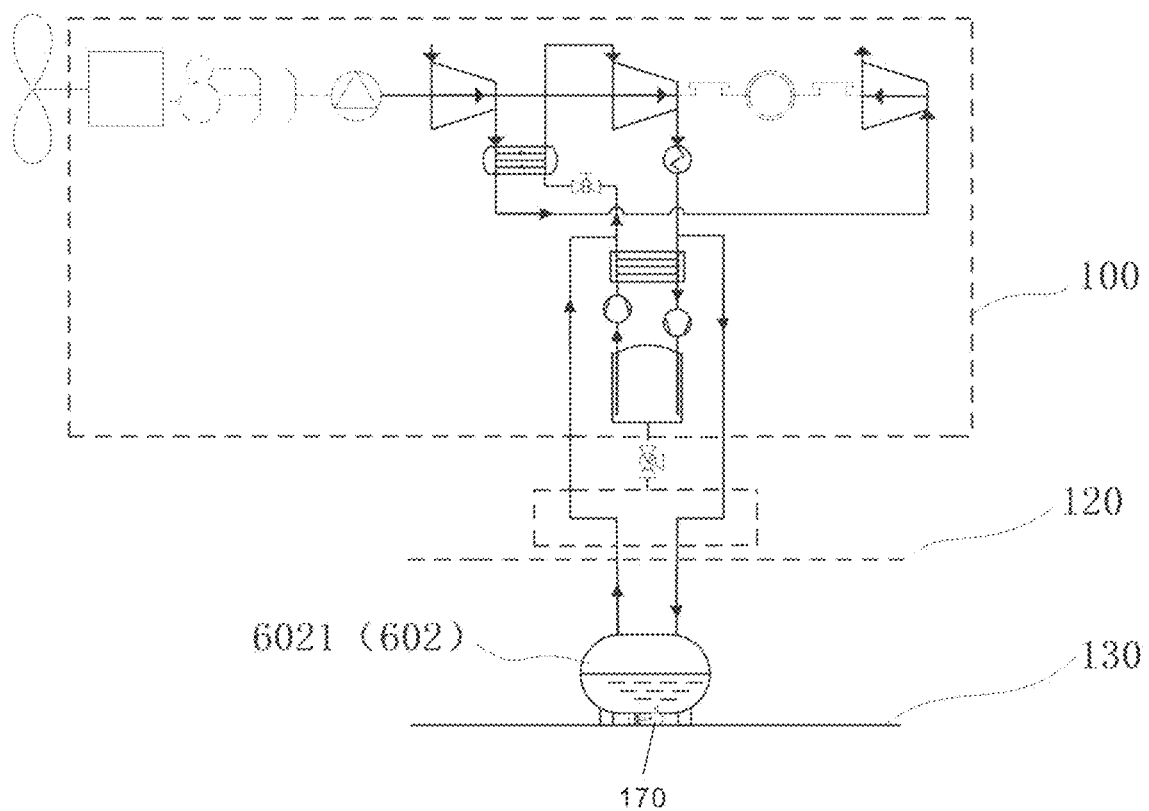
FIG. 5 is a schematic structural diagram of a second kind of offshore wind turbine generator set having a compressed energy storage system according to the examples of the present invention.

In one embodiment, referring to FIGS. 2-4, the second air storage device 602 includes a flexible air bag 6022, and the inner cavity of the flexible air bag 6022 is in connection with the inner cavity of the first air storage device 601. Using a flexible air bag 6022 has low costs and does not consume the expensive onshore land space.

In one example, the flexible air bag 6022 is connected to the tower barrel 10 by means of a lifting mechanism 20, the lifting mechanism 20 includes a first pulley block 2001 fixedly provided on the tower barrel 10, a second pulley block 2002 fixedly provided on the sea floor 130, and a rope 2003 connected between the first pulley block 2001 and the second pulley block 2002, the flexible air bag 6022 is connected to the rope 2003, the first pulley block 2001 is connected to a second motor generator, and the second motor generator can be used as a motor and a generator respectively. Specifically, the compressed air is first stored in the flexible air bag 6022, so that compressed air energy storage is implemented, and the volume of the flexible air bag 6022 is increased, thereby improving the energy density of the buoyancy energy storage; then, buoyancy energy storage is performed, and in the descending process of the flexible air bag 6022, the second motor generator is used as a motor, and the rotation of the second motor generator can drive the first pulley block 2001 to rotate, thereby driving the rope 2003 wound around the first pulley block 2001 to move; as the flexible air bag 6022 is connected to the rope 2003, thereby driving the descending of the flexible air bag 6022, and the power consumption of the second motor generator is converted into buoyancy energy storage in this process. Otherwise, first, buoyancy energy release is performed, in the ascending process of the flexible air bag 6022, the second motor is used as a power generator, the flexible air bag 6022 ascends, so as to drive the first pulley block 2001 to rotate by driving the movement of the rope 2003, thereby driving the second motor generator to generate power; then, compressed air energy release is performed, and the compressed air in the flexible air bag 6022 is released, so that the volume of the flexible air bag 6022 is reduced, and the volume capacity of the next round of air energy storage is provided.

In some specific examples, the first pulley block 2001 and the second motor generator are coaxially connected. Of course, they can also be connected by means of a transmission mechanism.

Specifically, the rope 2003 is connected to the flexible air bag 6022 by means of a rope. In some examples, there are four connection points. That is, the flexible air bag 6022 is connected to the rope 2003 by means of four rope clips. Specifically, the upper portion of the flexible air bag 6022 is connected to the rope 2003 wound around the first pulley block 2001 by using two rope clips, and the lower portion of the flexible air bag 6022 is connected to the rope 2003 wound around the second pulley block 2002 by using two rope clips. The flexible air bag 6022 may float over the sea level 120 or descend below the sea level 120.

In this way, the high-pressure compressed air energy storage can be coupled to the buoyancy energy storage of the floating flexible air bag 6022, and after coupling, the energy storage capacity and density can be improved, and in addition, the buoyancy potential energy of the flexible air bag 6022 itself and the internal high-pressure air potential energy are utilized. The designed maximum air storage internal pressure of the flexible air bag 6022 is consistent with the designed maximum descending depth buoyancy. The principle of buoyancy energy storage is as follows: only a single working medium, i.e. air, is in the flexible air bag 6022, and by changing the volume of the flexible air bag 6022 during inflation and deflation, the drainage volume of the flexible air bag 6022 is changed, thereby affecting the buoyancy of the flexible air bag 6022.

The system for coupling buoyancy energy storage can still maintain the compressed air energy storage sub-system to operate at a fixed pressure by using the hydrostatic pressure of water, thereby preventing the air compressor set and the air expander set from deviating from the designed working condition and running inefficiently due to pressure changes.

Specifically, the first pulley block 2001 is provided on a base of the tower barrel 10.

Alternatively, the rope 2003 includes a steel cable.

Alternatively, the control cable of the second motor generator is connected to an electric control system of a wind turbine set.

In one example, the second air storage device 602 includes rigid storage tank 6021 provided under water, and the inner cavity of the rigid storage tank 6021 is in connection with the inner cavity of the first air storage device 601. Referring to FIGS. 5 to 8, similarly, for three different structures of the tower barrel 10, the rigid storage tank 6021 may be in connection with the first air storage device 601 by means of pipelines. In this way, the seawater drainage energy storage of compressed air and water pressure energy storage of the fixed rigid storage tank 6021 are combined, and after coupling, the energy storage capacity and density can be improved, and in addition, the seawater extraction energy storage of the rigid storage tank 6021 itself and the internal high-pressure air potential energy thereof are utilized. The designed maximum air storage internal pressure of the rigid storage tank 6021 is consistent with the designed maximum water discharge pressure. The rigid storage tank 6021, which is provided underwater, can be cast on the sea floor with low-cost concrete without additional ballast to overcome buoyancy, without consuming the expensive onshore land space.

In one example, the rigid storage tank 6021 is connected to a drainage device and a water suction device. The rigid storage tank 6021 has a rigid structure. The rigid storage tank 6021 includes two working mediums, i.e. air and water, and the water discharge device and the water suction device are used to change a volume of water that can be stored, so as to change the volume of the air that can be stored, thereby affecting pressure potential energy of air and gravitational potential energy of water.

In one example, the drainage device and the water suction device are integrally provided, and include a generator motor and a reversible pump turbine which are connected to each other, and the pump turbine is connected to the rigid storage tank 6021 by means of an internal water inlet and outlet pipeline. The generator motor may be used as a generator or as a motor. The reversible pump turbine can be used for suctioning water, and can also be used for draining water, so as to achieve two functions. When the rigid storage tank 6021 drains water, the generator motor serves as a motor to drive the reversible pump turbine to generate power to suction and drain water, so that the volume of the air that can be stored becomes larger, and then is used for storing compressed air in an air energy storage process, thereby implementing gravitational energy storage and compressed air energy storage. When the compressed air is released, the compressed air in the rigid storage tank 6021 is released and the air pressure is reduced; a pressure difference exists inside and outside the rigid storage tank 6021; and then driven by the water suctioning of the reversible pump turbine, the generator motor serves as a generator to generate power to the outside, thereby implementing the energy release of the compressed air and the energy release of gravity.

Alternatively, the generator motor and the reversible pump turbine are provided at the bottom of the base of the rigid storage tank 6021. A control cable of the generator motor is connected to an electric control system of the wind turbine set.

The coupled buoyancy or gravitational energy storage can increase the capacity and density of compressed air energy storage in a large proportion, and there is no need to establish a floater for buoyancy energy storage or upper and lower cavities for gravitational energy storage.

In the combined air storage device, the ratio of the combined air storage is flexible, and the air storage ratio of the first air storage device 601 and the second air storage device 602 can be reasonably allocated according to the wind site selection, the geological condition, the deep sea condition, the capacity of the wind turbine set and the air storage space required by the compressed air energy storage.

In one example, a buffer tank 30 is further provided in the wind turbine generator compartment 100, the buffer tank 30 is adapted to store air in a liquid state or in a super/trans-critical state, the buffer tank 30 is in connection with the combined air storage device 6, an input end of the buffer tank 30 is connected to the air compressor set 2, and an output end of the buffer tank 30 is connected to the air expander set 3.

The buffer tank 30 can be provided for compressed storage of air in a liquid or super/trans-critical state. By storing compressed air in a liquid state or a super/trans-critical state, the system efficiency can be significantly improved; and the specific air storage state of the compressed energy storage system can be flexibly selected according to the power and duration of the stored electrical energy required by the wind power plant or the off-peak electricity.

In one example, referring to FIG. 1, the buffer tank 30 is integrated within the wind turbine generator compartment 100. By means of this arrangement, the space in the wind turbine generator compartment 100 can be fully utilized, and more electromechanical apparatuses in the compressed air energy storage system are integrated in the wind turbine generator compartment 100, thereby reducing the space occupied by the electromechanical apparatuses.

According to the examples of the present invention, a second aspect of the present invention further provides a compressed energy storage system, including a power grid and the offshore wind turbine generator set according to any one of the described technical solutions, the first motor generator 4 and the three-in-one motor 5 are both electrically connected to a power grid in a controllable manner, and the air compressor set 2 is connected to the input end of the combined air storage device 6 by means of an energy storage pipeline, and the air expander set 3 is connected to the output end of the combined air storage device 6 by means of an energy release pipeline.

Specifically, during energy storage, the air compressor set 2 is driven to operate by using ample electric energy on an offshore wind power plant or electric energy of a power grid, and the low-pressure air is compressed to a liquid state or a super/trans-critical state according to the power and duration for storing the electric energy, and is stored in the combined air storage device 6, i.e. stored in the first air storage device 601 and/or the second air storage device 602.

During energy release, the compressed air in the combined air storage device 6 is outputted to the air expander set 3 for expansion to generate power.

In one example, a common heat exchange device 40 is provided between the air compressor set 2 and the air expander set 3, the common heat exchange device 40 includes a first heat exchange channel for circulating compressed air, a second heat exchange channel for circulating expanded air, and a third heat exchange channel for circulating a heat exchange working medium, the first heat exchange channel is connected to the energy storage pipeline, and the second heat exchange channel is connected to the energy release pipeline.

Specifically, the heat exchange devices with a small temperature difference and a small pressure difference on the energy storage pipeline and the energy release pipeline are both used to reduce the costs of the energy storage and heat exchange sub-system. The configurations of the air compressor set 2 and the air expander set 3 are different in different application scenarios, and the positions and the number of the common heat exchange devices may be arranged according to the temperature difference and the pressure difference of the matched heat exchangers.

Figure 9:
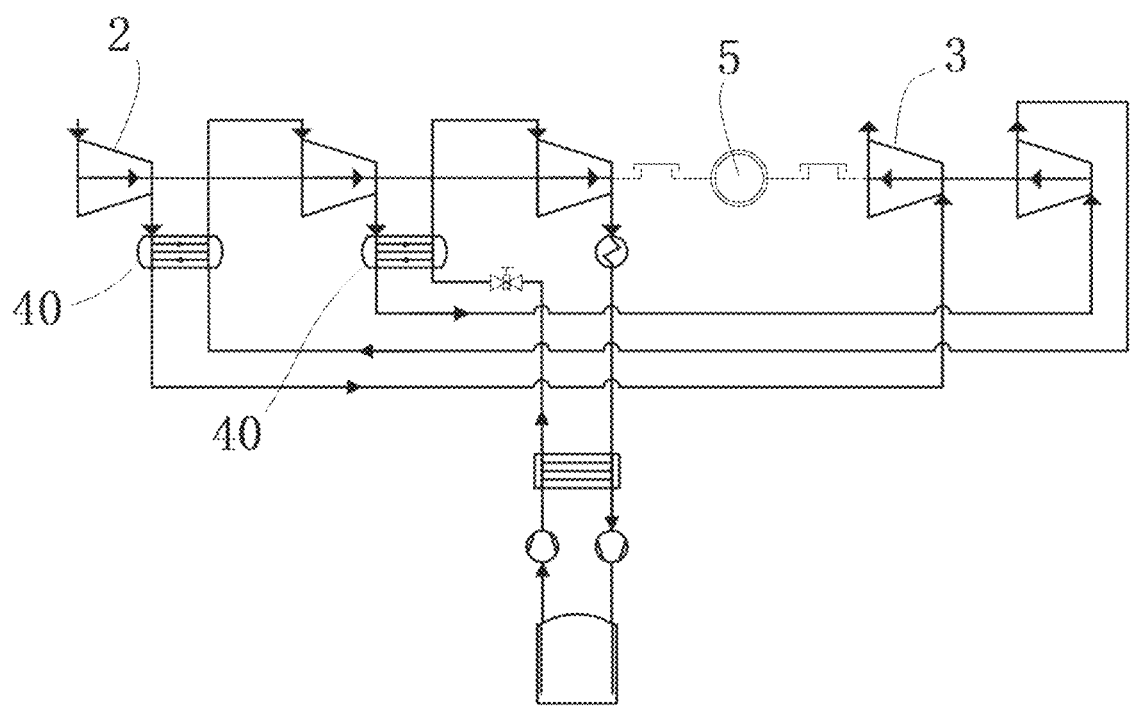
FIG. 9 is a first schematic structural diagram of an air compressor set and an air expander set in a compressed energy storage system in connection with a common heat exchange device according to the examples of the present invention.

Specifically, the air compressor set 2 and the air expander set 3 both include a first pressure side and a second pressure side, and the pressure on the first pressure side is lower than the pressure on the second pressure side, that is, the first pressure side is a low pressure side, and the second pressure side is a high pressure side. As one example, the air compressor set 2 and the air expander set 3 on the first pressure side and the second pressure side are both connected to the common heat exchange device 40, that is, the air compressor set 2 and the air expander set 3 share a heat exchange device no matter on the low pressure side or the high pressure side, as shown in FIG. 9. Specifically, in this example, there are two common heat exchange devices 40 which respectively provided at the first pressure side and the second pressure side, that is, an air compressor on the low pressure side and an air expander on the low pressure side are connected to a common heat exchange device 40 at the first pressure side in a heat exchange manner, and an air compressor on the high pressure side and an air expander on the high pressure side are connected to a common heat exchange device 40 on the second pressure side in a heat exchange manner. Of course, a plurality of common heat exchange devices 40 may also be provided and are correspondingly connected to air compressors and air expanders of different pressure levels. By sharing the common heat exchange device 40 by the air compressor set 2 and the air expander set 3, the investment and construction costs of the heat exchange system are reduced.

Figure 10:
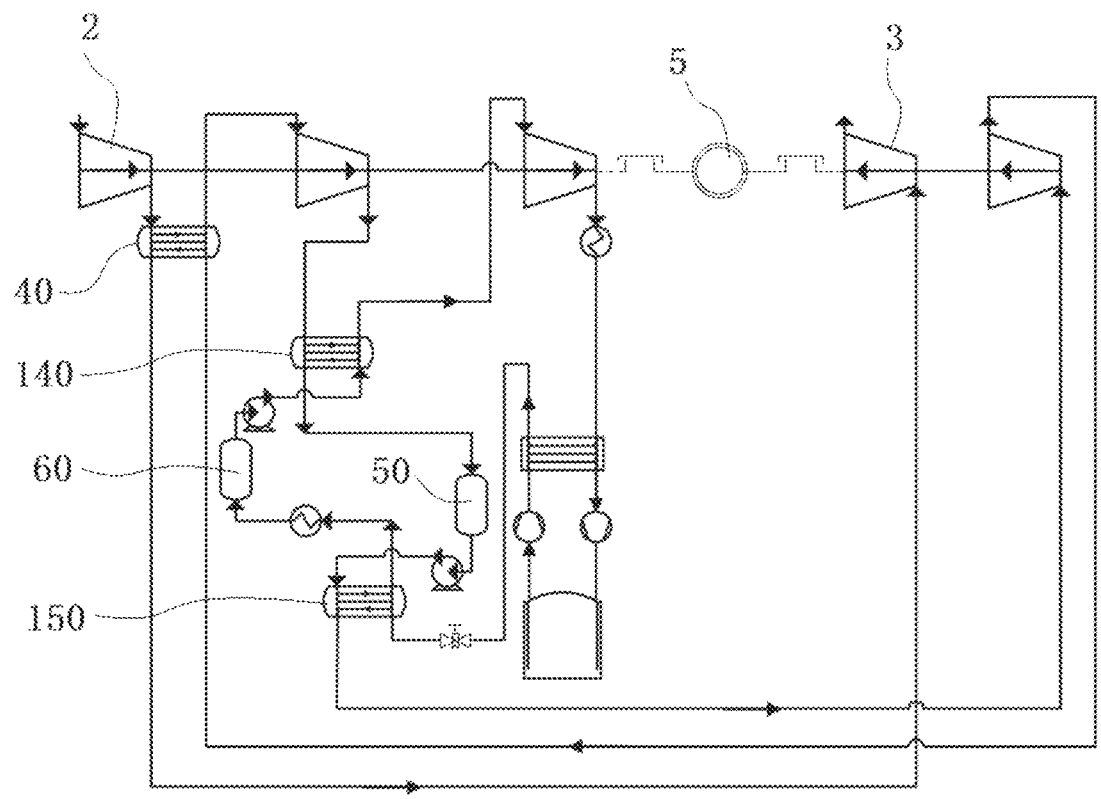
FIG. 10 is a second schematic structural diagram of the air compressor set and the air expander set in the compressed energy storage system in connection with the common heat exchange device according to the examples of the present invention.

In some examples, with reference to FIG. 10, the common heat exchange device 40 is provided merely on the first pressure side. That is, the air compressor on the low pressure side and the air expander on the low pressure side share the common heat exchange device 40. Temperature parameters of the common heat exchange devices 40 on the low pressure side are close to each other, and as the pressure difference is small, the number and tonnage of heat exchange apparatuses can be reduced after sharing the common heat exchange devices 40.

Figure 11:
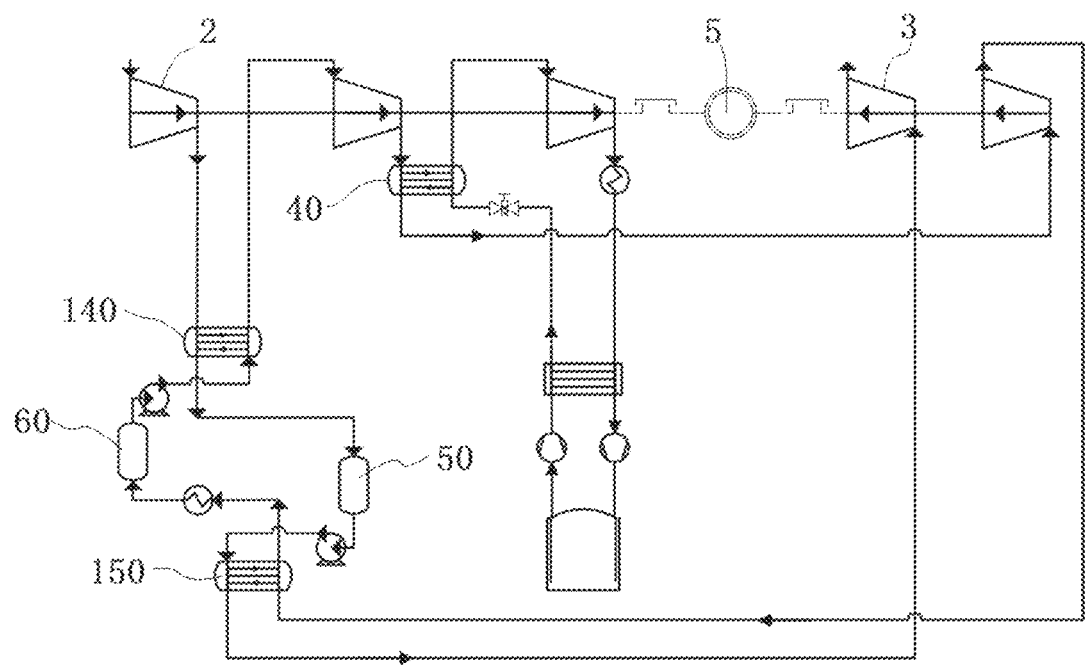
FIG. 11 is a third schematic structural diagram of the air compressor set and the air expander set in the compressed energy storage system in connection with the common heat exchange device according to the examples of the present invention.
Figure 12:
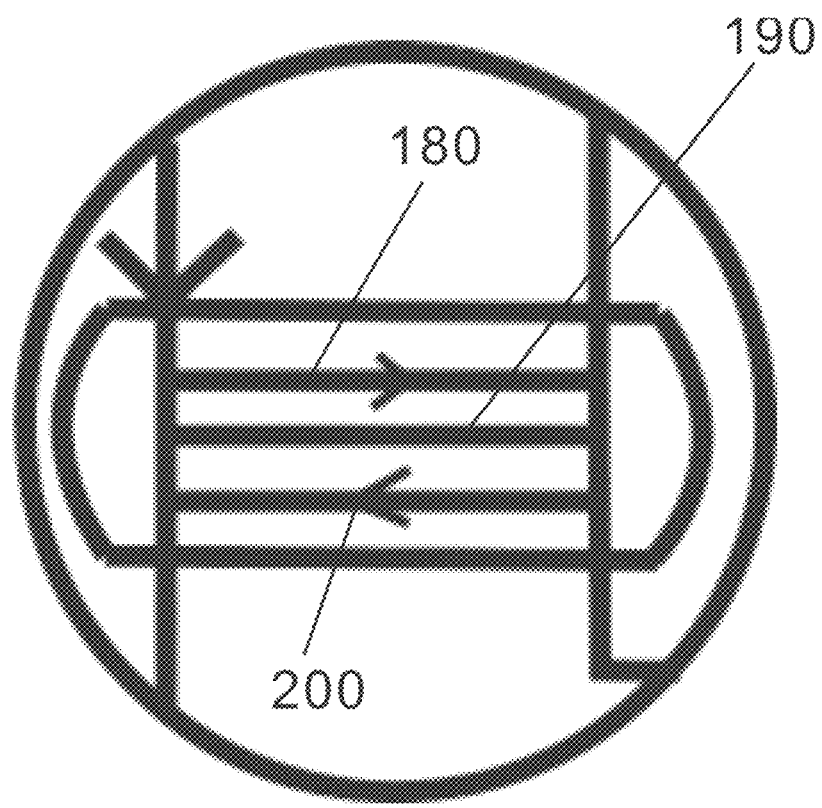
FIG. 12 is an enlarged view showing A of FIG. 1.

In some examples, referring to FIG. 11, the common heat exchange devices 40 are provided only at the second pressure side. That is, the air compressors on the high pressure side and the air expanders on the high pressure side share the common heat exchange devices 40. As the temperature parameters of the common heat exchange devices 40 on the high pressure side are close to each other, and the pressure difference is large, when the first heat exchange channel and the second heat exchange channel are switched to operate, the pressure change needs to be considered, and after the common heat exchange devices 40 are shared, the number and tonnage of the heat exchange apparatuses can be obviously reduced.

In some examples, referring to FIG. 10 or FIG. 11, a cooler 140 is connected between adjacent air compressors, and a reheater 150 is connected between adjacent air expanders. When the air compressors and the air expanders share the common heat exchange devices 40, the cooler 140 and the reheater 150 of the corresponding level are omitted. During energy storage, the air is cooled by a common heat exchange device 40, and during energy release, the air is heated by the common heat exchange device 40.

In some examples, with reference to FIG. 10 or FIG. 11, a heat collection device 50 and a cold storage device 60 are connected between the cooler 140 and the reheater 150. The cooler 140 is used for cooling air in the energy storage process, and the replaced heat is stored in the heat collection device 50, and can be used for heating air in the energy release process. The reheater 150 is used for heating the air during the energy release process, and the replaced cold is stored in the cold storage device 60, and can be used for reducing the temperature of the air during the energy storage process, so as to achieve the recycling of the heat.

In some examples, referring to FIG. 9 to FIG. 11, a pressure decreasing device 80 is connected between the output end of the air compressor set 2 and the input end of the buffer tank 30, and is used for reducing the pressure of compressed air during the energy storage process, and the compressed air is stored in the combined air storage device 6 by means of the buffer tank 30. Specifically, the pressure decreasing device 80 includes a liquid expander or a throttle valve.

In some examples, referring to FIG. 9 to FIG. 11, a pressure increasing device 90 is connected between the input end of the air expander set 3 and the output end of the buffer tank 30. During the energy release process, the compressed air stored in the combined air storage device 6 is outputted to the buffer tank 30, pressurized by the pressure increasing device 90, and then inputted into the air expander set 3. In particular, the pressure increasing device 90 includes a pressure increasing pump, in particular a cryogenic pump.

In some examples, with reference to FIG. 1, FIG. 5, or FIG. 9 to FIG. 11, the compressed air energy storage system further includes a cold storage heat exchanger 70, and the cold storage heat exchanger 70 includes a first channel through which compressed air flows during the energy storage process, a second channel through which expanded air flows during the energy release process, and a third channel through which a heat exchange medium flows. During the energy storage process, the cold energy stored in the cold storage heat exchanger 70 is used to perform equal-pressure cooling and liquidation on the compressed air, and then the compressed air is stored in the combined air storage device 6 at a normal pressure after the pressure thereof is decreased by the pressure decreasing device 80. During the energy release process, the cold storage heat exchanger 70 is used for heating air to a normal temperature.

Working Principle:

I. During energy storage, the multi-stage air compressor is driven by using ample electric energy on an offshore wind power plant or electric energy of a power grid, the low-pressure air is compressed to a liquid state or a super/trans-critical state according to the power and duration for storing the electric energy, after the air is cooled to normal temperature by the common heat exchange device 40, equal-pressure cooling and liquidation is performed on the compressed air by using the cold energy stored in the cold storage heat exchanger 70, and after the pressure there of is decreased by the pressure decreasing device 80, the compressed air is stored in the combined air storage device 6 at a normal pressure.

1. When buoyancy energy storage is coupled, air energy storage is performed first to increase the volume of the flexible air bag 6022, so as to improve the energy density of buoyancy energy storage, and then buoyancy energy storage is performed. The second motor generator consumes power to drive the flexible air bag 6022 fixedly connected to the rope 2003 to descend to a target position.

2. When gravitational energy storage is coupled, before air energy storage is performed, gravitational energy storage is performed to increase the volume of an energy storage space, thereby increasing the capacity of air energy storage. Water suctioning and drainage is performed by means of a generator motor and a reversible pump turbine which are located at the sea floor 130, so as to achieve a maximum drainage volume.

II. During energy release, the air in a liquid or super/trans-critical state in the combined air storage device 6 is pressurized, and then is heated to a normal temperature by the cold storage heat exchanger 70, the compression heat in the common heat exchange device 40 is absorbed, and finally the air is expanded by the multi-stage air expander to generate and output power to the outside.

1. When buoyancy energy release is coupled, before air energy release is performed, buoyancy energy release is performed first, so that a high buoyancy energy density is used, and a flexible air bag 6022 ascends to an upper target position by means of buoyancy. In this process, the ascending of the flexible air bag 6022 drives, by means of a rope 2003, a first pulley block 2001 to rotate, thereby driving a second motor generator coaxially connected to the first pulley block 2001 to generate power.

2. When gravitational energy release is coupled, air energy release is performed first to use a high water pressure energy release density, and then gravitational energy release is performed. As the compressed air in the rigid storage tank 6021 is released, the air pressure inside the rigid storage tank 6021 decreases, and there is a pressure difference inside and outside the rigid storage tank 6021, the rigid storage tank 6021 suctions water to achieve a maximum water suctioning volume, so as to drive the reversible pump turbine to operate, thereby driving the generator motor located at the sea floor 130 to generate power.

In one example, a plurality of offshore wind turbine generator sets are provided, a plurality of second air storage devices 602 are provided, and any number of first air storage devices 601 are connected to any number of second air storage devices 602. That is, one first air storage device 601 may be connected to a plurality of second air storage devices 602, or a plurality of first air storage devices 601 may also be connected to one second air storage device 602, or a plurality of first air storage devices 601 may also be correspondingly connected to a plurality of second air storage devices 602 in one-to-one correspondence.

The compressed energy storage system provided in the present invention improves the compressed air energy storage capacity and density by means of buoyancy or gravitational energy storage, a low-cost air storage device of a compressed air energy storage system adapted to the capacity of an offshore wind turbine uses a joint proportion method, mechanical apparatuses and electrical apparatuses use a coaxial compact arrangement method, a low-cost heat exchange system uses a heat exchanger sharing method, and these apparatuses are directly embedded in an offshore wind turbine generator set compartment to couple a wind power plant at a source side.

Although the examples of the present invention are described with reference to the accompanying drawings, various modifications and variations can be made by those skilled in the art without departing from the spirit and scope of the present invention, and all such modifications and variations belong to the scope of the present invention as defined by the appended claims.

What is claimed is:

1. An offshore wind turbine generator set having a compressed energy storage system, comprising a wind turbine generator set (1), an air compressor set (2), an air expander set (3), a first motor generator (4), and a motor (5) which are provided in a wind turbine generator compartment (100), and a combined air storage device (6) provided outside the wind turbine generator compartment (100), wherein the first motor generator (4) has a first input shaft and a first output shaft, the first input shaft is connected to the wind turbine generator set (1) by means of a first clutch (7), and the first output shaft is connected to the air compressor set (2);

the air compressor set (2) and the air expander set (3) are coaxially connected by means of the motor (5), the motor (5) comprises a second output shaft and a second input shaft, the second output shaft is connected to the air compressor set (2) by means of a second clutch (8), and the second input shaft is connected to the air expander set (3) by means of a third clutch (9);

the combined air storage device (6) comprises a first air storage device (601) provided in a tower barrel (10) and a second air storage device (602) provided on the sea, the inner cavity of the first air storage device (601) is in connection with the inner cavity of the second air storage device (602), an input end of the combined air storage device (6) is connected to the air compressor set (2), and an output end of the combined air storage device (6) is connected to the air expander set (3);

and the first motor generator (4) and the motor (5) are both electrically connected to a power grid, the air compressor set (2) is connected to the input end of the combined air storage device (6) by means of an energy storage pipeline, and the air expander set (3) is connected to the output end of the combined air storage device (6) by a pipeline.

2. The offshore wind turbine generator set having a compressed energy storage system according to claim 1, wherein the tower barrel (10) comprises two or more tower barrel segments (1001) connected in an axial direction, the first air storage device (601) is provided in at least one of the tower barrel segments (1001), or the first air storage device (601) is at least one of the tower barrel segments (1001);

or the tower barrel (10) comprises an outer barrel body (1002) and an inner barrel body (1003) which are sheathed, the first air storage device (601) is provided in a cavity between the outer barrel body (1002) and the inner barrel body (1003), or the cavity between the outer barrel body (1002) and the inner barrel body (1003) serves as the first air storage device (601).

3. The offshore wind turbine generator set having a compressed energy storage system according to claim 2, wherein the second air storage device (602) comprises a rigid storage tank (6021) provided under water, and the inner cavity of the rigid storage tank (6021) is in connection with the inner cavity of the first air storage device (601);

or, the second air storage device (602) comprises a flexible air bag (6022), and the inner cavity of the flexible air bag (6022) is in connection with the inner cavity of the first air storage device (601).

4. The offshore wind turbine generator set according to claim 3, wherein the rigid storage tank (6021) is connected to a device with functions of drainage and water suction.

5. The offshore wind turbine generator set having a compressed energy storage system according to claim 3, wherein the flexible air bag (6022) is connected to the tower barrel (10) by means of a lifting mechanism (20), the lifting mechanism (20) comprises a first pulley block (2001) fixedly provided on the tower barrel (10), a second pulley block (2002) fixedly provided on the sea floor (130), and a rope (2003) connected between the first pulley block (2001) and the second pulley block (2002), the flexible air bag (6022) is connected to the rope (2003), and the first pulley block (2001) is connected to a second motor generator.

6. The offshore wind turbine generator set having a compressed energy storage system according to claim 2, wherein a buffer tank (30) is further provided in the wind turbine generator compartment (100), the buffer tank (30) is adapted to store air in a liquid state, the buffer tank (30) is in connection with the combined air storage device (6), an input end of the buffer tank (30) is connected to the air compressor set (2), and an output end of the buffer tank (30) is connected to the air expander set (3).

7. The offshore wind turbine generator set having a compressed energy storage system according to claim 2, wherein a common heat exchange device (40) is provided between the air compressor set (2) and the air expander set (3), the common heat exchange device (40) comprises a first heat exchange channel for circulating compressed air, a second heat exchange channel for circulating expanded air, and a third heat exchange channel for circulating a heat exchange working medium, the first heat exchange channel is connected to the energy storage pipeline, and the second heat exchange channel is connected to the energy release pipeline.

8. The offshore wind turbine generator set having a compressed energy storage system according to claim 2, wherein a common heat exchange device (40) is provided between the air compressor set (2) and the air expander set (3), the common heat exchange device (40) comprises a first heat exchange channel for circulating compressed air, a second heat exchange channel for circulating expanded air, and a third heat exchange channel for circulating a heat exchange working medium, the first heat exchange channel is connected to the energy storage pipeline, and the second heat exchange channel is connected to the energy release pipeline.

9. The offshore wind turbine generator set having a compressed energy storage system according to claim 8, wherein a plurality of offshore wind turbine generator sets are provided, and a plurality of second air storage devices (602) are provided.

10. The offshore wind turbine generator set having a compressed energy storage system according to claim 1, wherein a buffer tank (30) is further provided in the wind turbine generator compartment (100), the buffer tank (30) is adapted to store air in a liquid state, the buffer tank (30) is in connection with the combined air storage device (6), an input end of the buffer tank (30) is connected to the air compressor set (2), and an output end of the buffer tank (30) is connected to the air expander set (3).

* * * * *